US010389144B2

(12) United States Patent
Jin (10) Patent No.: US 10,389,144 B2
(45) Date of Patent: Aug. 20, 2019

(54) BATTERY PROTECTION CIRCUIT MONITORING A STATE OF A CHARGING SWITCH AND BATTERY PACK INCLUDING SAME (71) Applicant: SAMSUNG SDI CO., LTD., Yongin-si, Gyeonggi-do (KR)

(72) Inventor: Kyong-Pil Jin, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 177 days.

(21) Appl. No.: 15/407,755

(22) Filed: Jan. 17, 2017

(65) Prior Publication Data
US 2017/0250549 A1 Aug. 31, 2017

(30) Foreign Application Priority Data

Feb. 25, 2016 (KR) .......................... 10-2016-0022629

(51) Int. Cl.
*H02H 7/18* (2006.01)
*H02J 7/00* (2006.01)

(52) U.S. Cl.
CPC ............ *H02J 7/0026* (2013.01); *H02H 7/18* (2013.01); *H02J 7/0031* (2013.01); *H02J 7/0081* (2013.01); *H02J 2007/0037* (2013.01)

(58) Field of Classification Search
CPC ...... H02J 7/0026; H02J 7/0081; H02J 7/0031; H02J 2007/0037; H02J 7/0068;
(Continued)

(56) References Cited

U.S. PATENT DOCUMENTS 6,172,482 B1    1/2001  Eguchi
2005/0225421 A1* 10/2005 Furuta ...................... H02H 7/18
                                                    337/167
(Continued)

FOREIGN PATENT DOCUMENTS

CN    102709977 A    10/2012
CN    102055211 B    4/2015
(Continued)

OTHER PUBLICATIONS

Korean Notice of Allowance dated Aug. 29, 2017, of the corresponding Korean Patent Application No. 10-2016-0022629.
(Continued)

*Primary Examiner* — Drew A Dunn
*Assistant Examiner* — Sailesh Thapa
(74) *Attorney, Agent, or Firm* — Lee & Morse, P.C.

(57) ABSTRACT

A battery protection circuit includes a charging switch, a resistor, a charging controller, a switching circuit, a fuse circuit, and a fuse driving circuit. The charging switch is connected to a first electrode of a battery cell. The resistor includes a first end connected to a second electrode of the battery cell. The charging controller supplies a charging control current. The switching circuit connects a second end of the resistor with a control terminal of the charging switch or blocks connection between the second end of the resistor and control terminal of the charging switch depending on the charging control current. The fuse circuit is connected to a charging path of the battery cell and blocks the charging path depending on a voltage applied to a control terminal of the fuse circuit. The fuse driving circuit switches the voltage applied to the control terminal of the fuse circuit depending on a voltage between the ends of the resistor.

15 Claims, 3 Drawing Sheets

(58) Field of Classification Search
CPC ......... H02J 2007/0039; H02J 2007/004; H02J
7/0021; H02J 7/0029; H02J 9/061; H02J
3/383; H02J 7/0014; H02J 7/0016; H02J
7/0045; H02J 3/005; H02J 7/0042; H02J
7/0047; H02J 7/007; H02J 7/35; H02J
2007/0067; H02J 2007/0096; H02J
7/0027; H02J 7/345; H02J 13/0003; H02J
13/0006; H02J 13/0075; H02J 13/0079;
H02J 1/00; H02J 1/14; H02J 2007/005;
H02J 2007/0095; H02J 3/14; H02J 3/16;
H02J 3/32; H02J 3/46; H02J 7/00; H02J
7/0006; H02J 7/0013; H02J 7/0022; H02J
7/0034; H02J 7/0044; H02J 7/0052; H02J
7/0054; H02J 7/0063; H02J 7/0065; H02J
7/0086; H02J 7/009; H02J 7/022; H02J
7/045; H02J 7/14; H02J 7/1415; H02J
7/1461; H02J 7/1492; H02J 9/02; H02H
7/18
See application file for complete search history.

(56) References Cited

U.S. PATENT DOCUMENTS

| | | |
|---|---|---|
| 2007/0273328 A1 | 11/2007 | Nam et al. |
| 2010/0123434 A1 | 5/2010 | Iwata |
| 2012/0056593 A1 | 3/2012 | Sakurai et al. |
| 2012/0139494 A1 | 6/2012 | Kim |
| 2013/0265010 A1* | 10/2013 | Nomura ................ H02J 7/0031 320/134 |
| 2014/0225568 A1* | 8/2014 | Chung ................ H02J 7/0031 320/112 |
| 2015/0200537 A1* | 7/2015 | Kang ...................... H02H 7/18 320/134 |

FOREIGN PATENT DOCUMENTS

| | | |
|---|---|---|
| EP | 2 894 759 A1 | 1/2015 |
| JP | 2012-060762 A | 3/2012 |
| KR | 10-2007-0113038 A | 11/2007 |
| KR | 10-2012-0059852 A | 6/2012 |
| KR | 10-1192146 B1 | 10/2012 |
| KR | 10-2013-0021839 A | 3/2013 |

OTHER PUBLICATIONS

Tahmid Mahbub, "Tahmid s blog: Low-Side MOSFET Drive Circuits and Techniques—7 Practical Circuits", Dec. 22, 2012 (Dec. 22, 2012), XP055375226, Retrieved from the Internet: URL:http://tahmidmc.blogspot.de/2012/12/low-side-mosfet-drive-circuits-and_23.html [retrieved on May 23, 2017].

European Search Report dated Jun. 27, 2017, of the corresponding European Patent Application No. 17157967.5.

* cited by examiner

BATTERY PROTECTION CIRCUIT MONITORING A STATE OF A CHARGING SWITCH AND BATTERY PACK INCLUDING SAME

CROSS-REFERENCE TO RELATED APPLICATION

Korean Patent Application No. 10-2016-0022629, filed on Feb. 25, 2015, and entitled, "Battery Protection Circuit and Battery Pack Including Same," is incorporated by reference herein in its entirety.

BACKGROUND

1. Field

One or more embodiments described herein relate to a battery protection circuit and a battery pack including a battery protection circuit.

2. Description of the Related Art

A battery pack may include a circuit to protect a secondary battery from being damaged during charging or discharging operations. A battery protection circuit may include a self-control protection (SCP) element which actively opens a fuse in order to protect the secondary battery from being overcharged and over-discharged.

Various methods have been used to control the operation of an SCP element. One method involves mounting a micro-controller unit (MCU) in the battery pack to monitor overcharge or over-discharge conditions. The MCU controls operation of the SCP element when either condition is detected. Another method involves mounting a protective integrated circuit (IC) in the battery pack, in addition to the main battery IC. The protective IC detects overcharge or over-discharge conditions and controls operation of the SCP element accordingly. However, both methods tend to increase costs.

SUMMARY

In accordance with one or more embodiments, a battery protection circuit includes a charging switch connected in series to a first electrode of a battery cell; a first resistor including a first end connected to a second electrode of the battery cell; a charging controller to supply a charging control current; a switching circuit to connect a second end of the first resistor with a control terminal of the charging switch or to block a connection between the second end of the first resistor and the control terminal of the charging switch depending on the charging control current; a fuse circuit connected in series to a charging path of the battery cell, the fuse circuit to block the charging path depending on a voltage applied to a control terminal of the fuse circuit; and a fuse driving circuit to switch the voltage applied to the control terminal of the fuse circuit depending on a voltage between the first and second ends of the first resistor.

The fuse circuit may be a self-control protection circuit. The fuse circuit may include a fuse connected in series to a second electrode of the battery cell, and one or more heating resistors connected in parallel between the fuse and the control terminal of the fuse circuit, the one or more heating resistors to emit heat depending on the voltage applied to the control terminal of the fuse circuit.

The fuse driving circuit may include an N-channel transistor connected between the first electrode of the battery cell and the control terminal of the fuse circuit; and a P-channel transistor including a first terminal and a control terminal respectively connected to the first and second ends of the first resistor and a second terminal connected to a control terminal of the N-channel transistor.

When the voltage between the first and second ends of the first resistor exceeds a threshold level, the P-channel transistor may be turned on to transfer a voltage applied to the first end of the first resistor to the control terminal of the N-channel transistor. The N-channel transistor may be turned on, depending on a voltage that is applied to the control terminal thereof through the P-channel transistor, to connect the first electrode of the battery cell with to the control terminal of the fuse circuit.

The switching circuit may include a transistor connected between the second end of the first resistor and the control terminal of the charging switch, the transistor to connect the second end of the first resistor with the control terminal of the charging switch depending on the charging control current.

In accordance with one or more other embodiments, battery pack includes a battery cell; a first pack terminal and a second pack terminal; a charging switch connected in series between a first electrode of the battery cell and the first pack terminal; a first resistor to include a first end connected to a second electrode of the battery cell; a charging controller to supply a charging control current; a switching circuit to connect a second end of the first resistor with a control terminal of the charging switch or to block a connection between the second end of the first resistor and the control terminal of the charging switch depending on the charging control current; a fuse circuit, connected in series between the second electrode of the battery cell and the second pack terminal, to block the charging path depending on a voltage applied to a control terminal of the fuse circuit; and a fuse driving circuit to switch the voltage applied to the control terminal of the fuse circuit depending on a voltage between the first and second ends of the first resistor.

The fuse circuit may be a self-control protection circuit, and the fuse circuit includes a fuse connected in series between the second electrode of the battery cell and the second pack terminal and one or more heating resistors connected in parallel between the fuse and the control terminal of the fuse circuit, the heating resistors emit to heat depending on the voltage applied to the control terminal of the fuse circuit.

The fuse driving circuit may include an N-channel transistor connected between the first electrode of the battery cell and the control terminal of the fuse circuit; and a P-channel transistor configured to include a first terminal and a control terminal that are respectively connected to the first and second ends of the first resistor and a second terminal connected to a control terminal of the N-channel transistor.

When the voltage between the first and second ends of the first resistor exceeds a threshold level, the P-channel transistor is turned on to transfer a voltage applied to the first end of the first resistor to the control terminal of the N-channel transistor. The N-channel transistor is turned on, depending on a voltage applied to the control terminal thereof through the P-channel transistor, to connect the first electrode of the battery cell with to the control terminal of the fuse circuit.

The switching circuit may include a transistor, connected between the second end of the first resistor and the control terminal of the charging switch, to connect the second end of the first resistor with the control terminal of the charging switch depending on the charging control current.

In accordance with one or more other embodiments, a battery protection circuit includes a charging switch connected to a first electrode of a battery cell; a resistor connected between the charging switch and a second electrode of the battery cell; and a fuse circuit to block a charging path of the battery cell, the fuse circuit including a fuse and a heater, the heater to heat the fuse to block the charging path based on a voltage drop across the resistor which is indicative of a defect of the charging switch. The heater may include at least one heating resistor adjacent to the fuse.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
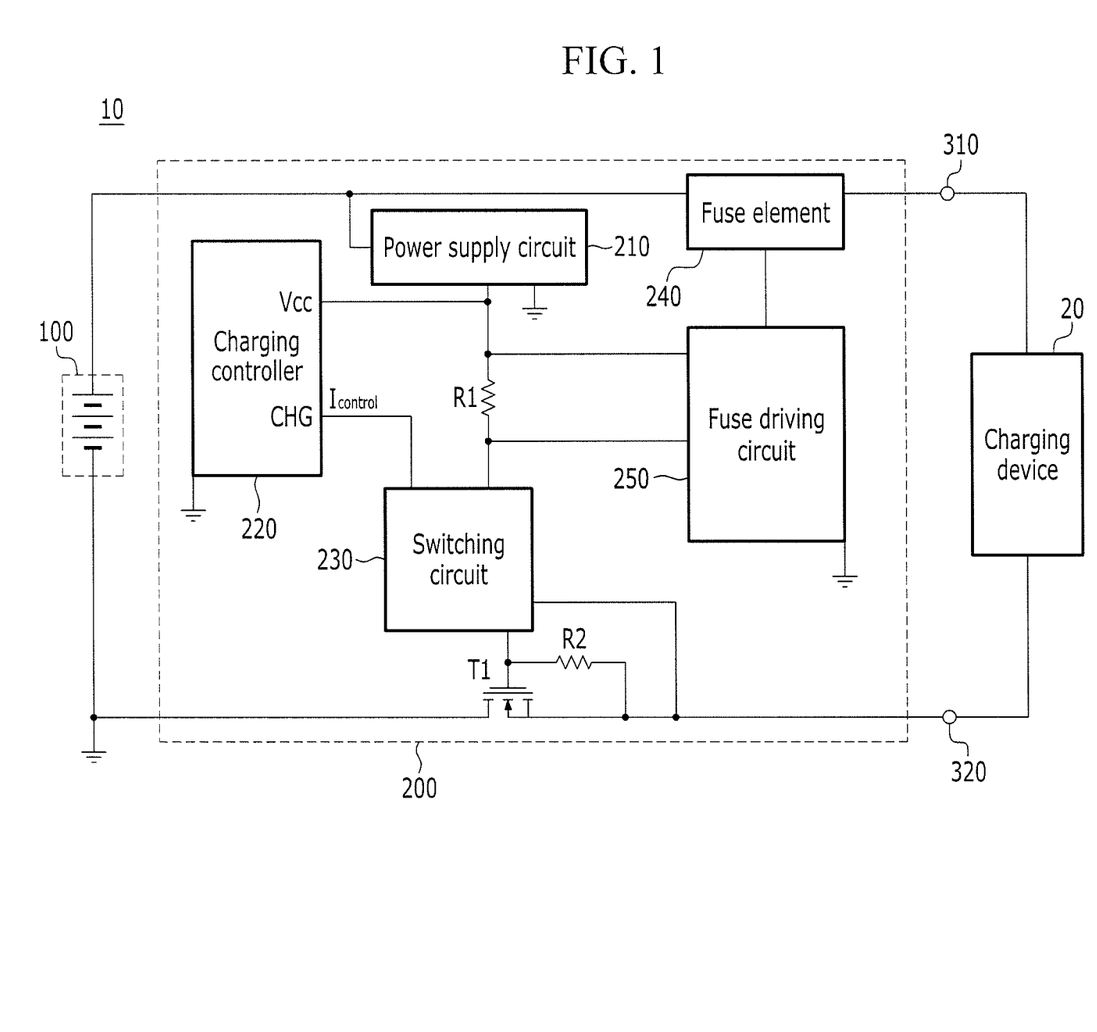
FIG. 1 illustrates an embodiment of a battery pack.
Figure 2:
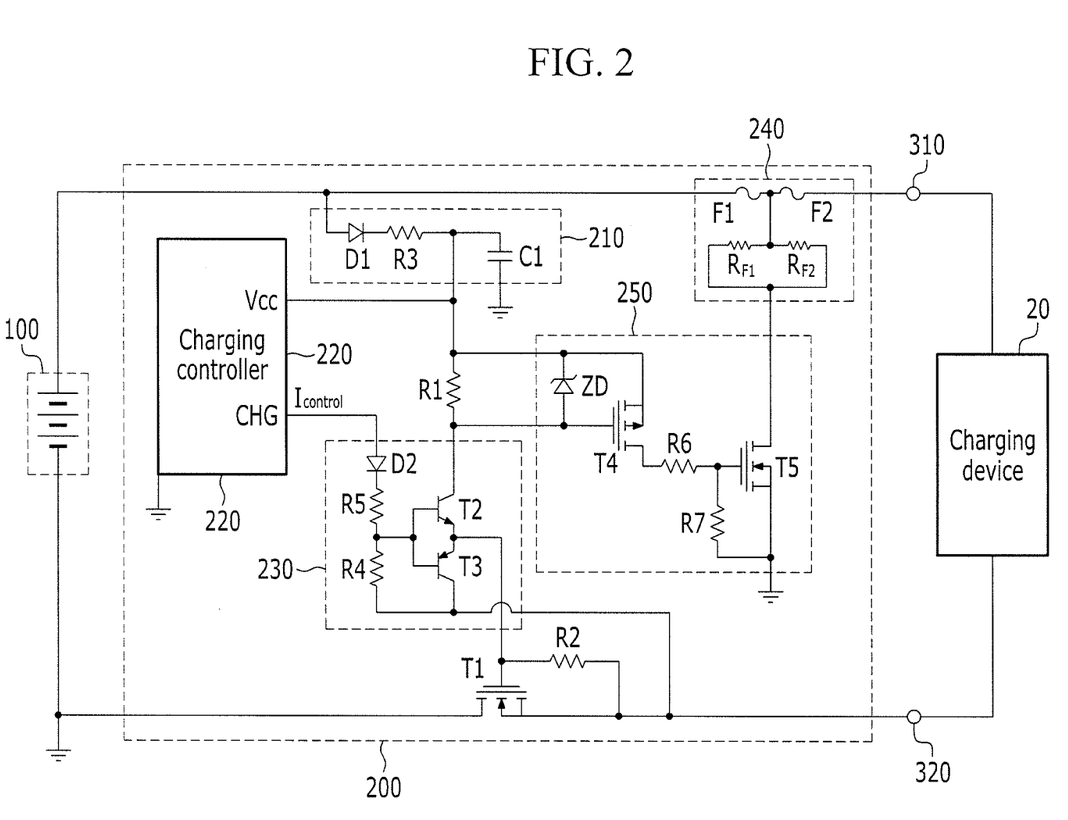
FIG. 2 illustrates another embodiment of a battery pack.
Figure 3:
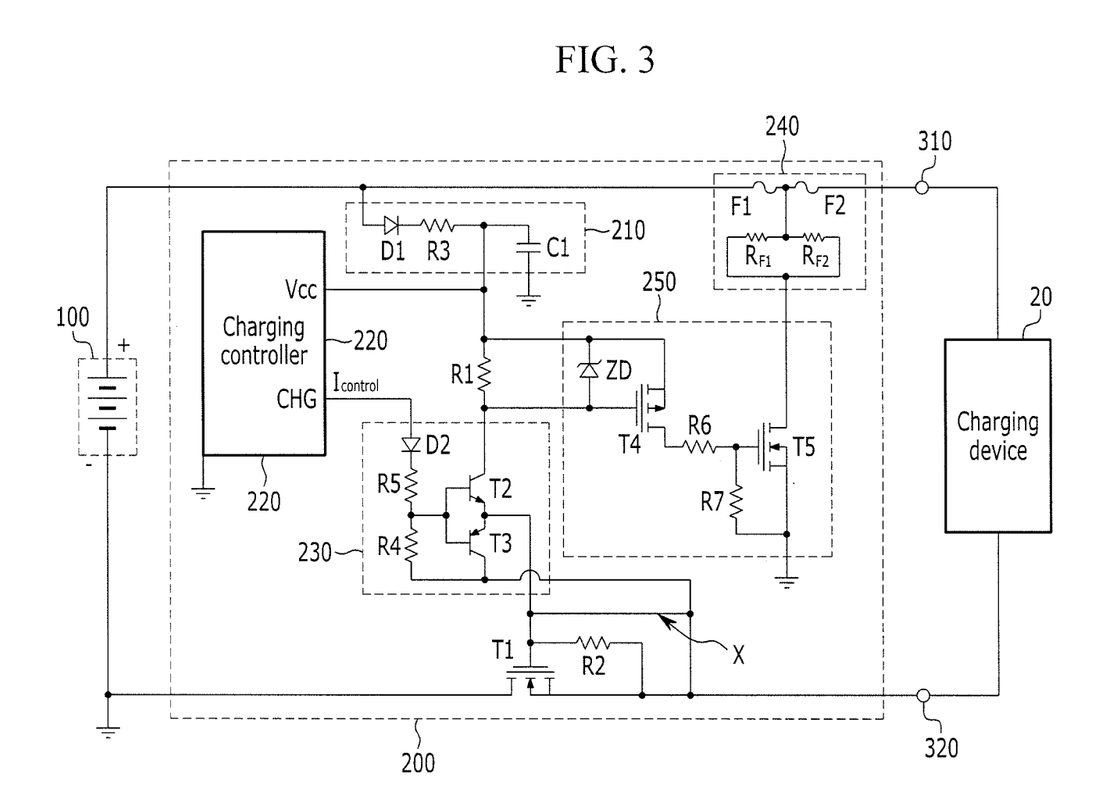
FIG. 3 illustrates an operation performed when a failure state is in the battery pack.

FIGS. 1-3 illustrate embodiments of a battery pack 10. FIG. 2 illustrates a more detailed embodiment of the battery pack 10 in FIG. 1. FIG. 3 illustrates an operation performed when a failure state (e.g., failure of a charging switch) is detected in the battery pack.

Referring to FIGS. 1 and 2, a battery pack 10 may include a battery cell 100, a battery protection circuit 200, and pack terminals 310 and 320. The battery protection circuit 200 is electrically connected between the battery cell 100 and the pack terminals 310 and 320 to protect the battery cell 100 from a damage from, for example, a short-circuit, disconnection, over-current, over-voltage, or other condition that may occur during a charging or discharging operation.

The battery protection circuit 200 may include a power supply circuit 210, a charging controller 220, a switching circuit 230, a fuse element 240, a fuse driving circuit 250, a charging switch T1, and resistors R1 and R2. The power supply circuit 210 may be electrically connected to a positive electrode of the battery cell 100. A voltage from the positive electrode of the battery cell 100 may be supplied as an operating power of the charging controller 220. The power supply circuit 210 may transfer the voltage from the positive electrode of the battery cell 100 to the switching circuit 230 through the first resistor R1.

In FIG. 2, the power supply circuit 210 includes a first diode D1 connected in series to the positive electrode of the battery cell 100, a third resistor R3, and a first capacitor C1. The anode and cathode of the first diode D1 are respectively connected to the positive electrode of the battery cell 100 and the third resistor R3. Ends of the third resistor R3 are respectively connected to the cathode of the first diode D1 and the first capacitor C1. The first end of the first capacitor C1 is connected to the third resistor R3, and the second end of the first capacitor C1 is grounded. A power supply terminal Vcc of the charging controller 220 and the first resistor R1 are connected to a first end of the third resistor R3, that is connected to the first capacitor C1.

In the power supply circuit 210, the first diode D1 and third resistor R3 transfer voltage from the positive electrode of the battery cell 100 to the power supply terminal Vcc of the charging controller 220 and the first resistor R1. The first capacitor C1 may constantly maintain the voltage transferred to the power supply terminal Vcc of the charging controller 220 and first resistor R1 by the power supply circuit 210.

The charging controller 220 may supply a charging control current $I_{control}$ to the switching circuit 230 through a charging control terminal CHG. The charging control current $I_{control}$ may have on or off level. For example, the on level of the charging control current $I_{control}$ may have a current of 6 uA. Further, when the charging controller 220 opens the charging control terminal CHG, the charging control current $I_{control}$ may have off level that corresponds to a high impedance.

When a charging voltage of the battery cell 100 is lower than a predetermined overcharge voltage level and when the charging device 20 is connected to the battery pack 10, the charging controller 220 may output the charging control current $I_{control}$ having an on level to the charging control terminal CHG. When the charging voltage of the battery cell 100 is equal to or higher than the overcharge voltage level or when the charging device 20 is separated from the battery pack 10, the charging controller 220 may output charging control current $I_{control}$ having an off level to the charging control terminal CHG.

The charging controller 220 may receive power from the power supply circuit 210 through the power supply terminal Vcc and then generate the charging control current $I_{control}$. In one embodiment, the charging controller 220 may be a battery IC which does not include an MCU mounted therein. As a result, costs may be reduced. Further, in one embodiment, the charging controller 220 may employ a current source method of an open-drain type in order to reduce or minimize power consumption.

The first resistor R1 is connected between the power supply circuit 210 and the switching circuit 230. The ends of the first resistor R1 are respectively connected to the power supply circuit 210 and the switching circuit 230. The first resistor R1 may be connected to the positive electrode of the battery cell 100, through the power supply circuit 210, in order to transfer voltage from the battery cell 100 to switching circuit 230.

The switching circuit 230 may electrically connect the first resistor R1 with a control terminal of the charging switch T1, for example, depending on the charging control current $I_{control}$ from the charging controller 220. For example, when the charging control current $I_{control}$ has an on level, the switching circuit 230 electrically connects the first resistor R1 with the control terminal of the charging switch T1. When charging control current $I_{control}$ has an off level, the switching circuit 230 blocks the first resistor R1 from being connected to the control terminal of the charging switch T1.

In FIG. 2, the switching circuit 230 may include first and second switches T2 and T3 connected in series and a forth resistor R4. The switching circuit 230 may further include a fifth resistor R5 and a second diode D2 connected in series to the charging control terminal CHG of the charging controller 220.

First and second terminals of the first switch T2 may be respectively connected to the second end of the first resistor R2 and the control terminal of the charging switch T1. A control terminal of the first switch T2 may be connected to the charging control terminal CHG of the charging controller 220. In the second switch T3, a first terminal and a second terminal are respectively connected to the first terminal and the control terminal of the charging switch T1. A control terminal of the second switch T3 is connected to the charging control terminal CHG of the charging controller 220. The forth resistor R4 may be connected between the first terminal and the control terminal of the second switch T3.

The first and second switches T2 and T3 may be, for example, NPN and PNP transistors, respectively. In this case, the first terminal, the second terminal, and the control terminal of each of the first and second switches T2 and T3 may serve as a collector terminal, an emitter terminal, and a base terminal, respectively.

The first and second switches T2 and T3 may serve as a push-pull circuit by connecting the control terminals to each other and the second terminals to each other. The push-pull circuit formed by the first and second switches T2 and T3 may switch the voltage applied to the control terminal of the charging switch T1 depending on the charging control current $I_{control}$ from the charging control terminal CHG of the charging controller 220.

When the charging control current $I_{control}$ from the charging control terminal CHG of the charging controller 220 has an on level, the first switch T2 of the push-pull circuit is turned on and the second switch T3 is turned off. Accordingly, the control terminal of the charging switch T1 is electrically connected with the first resistor R1. Thus, the voltage from the positive electrode of the battery cell 100 is applied to the control terminal of the charging switch T1, via the first resistor R1, to turn on the charging switch T1.

In contrast, when the charging control current $I_{control}$ from the charging control terminal CHG of the charging controller 220 has an off level, the first switch T2 of the push-pull circuit is turned off and the second switch T3 is turned on. Accordingly, the control terminal of the charging switch T1 is electrically connected with the first terminal of the second switch T3, thereby turning off the charging switch T1.

A second diode D2 may be connected in series between the control terminals of the first and second switches T2 and T3 and the charging control terminal CHG of the charging controller 220, in order to prevent current from flowing backward to the charging control terminal CHG of the charging controller 220.

The charging switch T1 may be connected in series to a charging path of the battery cell 100, in order to block or connect the charging path of the battery cell 100, depending on the voltage supplied from the switching circuit 230 to the control terminal of the charging switch T1. The charging path is a current path between the battery cell 100 and the charging device 20 connected through the pack terminals 310 and 320. This charging path may be also referred to as a large current path since a current flowing therethrough has a relatively large magnitude.

In FIG. 2, the charging switch T1 may be connected in series to a charging path connected to a negative electrode of the battery cell 100. The first and second terminals of the charging switch T1 are respectively connected to the negative electrode pack terminal 320 of the battery pack 10 and the negative electrode of the battery cell 100. The charging switch T1 electrically connects the negative electrode pack terminal 320 of the battery pack 10 with the negative electrode of the battery cell 100, or blocks the connection between the negative electrode pack terminal 320 of the battery pack 10 and the negative electrode of the battery cell 100, depending on a voltage applied to the control terminal of the charging switch T1 by the switching circuit 230. As a result, the charging path is blocked or connected.

The charging switch T1 may be an N-channel electric field effect transistor. The first terminal, the second terminal, and the control terminal of the charging switch T1 may serve as a source terminal, a drain terminal, and a gate terminal, respectively.

A second resistor R2 may be connected between the first terminal and the control terminal of the charging switch T1. The second resistor R2 serves as a pull-down resistor for preventing a voltage of the control terminal of the charging switch T1 from falling in a state that cannot be defined.

The fuse element 240 may be connected in series to the charging path of the battery cell 100 to block the charging path of the battery cell 100. For example, in FIG. 2, the fuse element 240 may serve as a self-control protection (SCP) element which includes a pair of fuses F1 and F2 connected in series to the charging path of the battery cell 100 and heating resistors $R_{F1}$ and $R_{F2}$ connected in parallel with the fuses F1 and F2.

The fuses F1 and F2 of the fuse element 240 may be connected in series between the positive electrode of the battery cell 100 and the positive electrode pack terminal 310. The heating resistors $R_{F1}$ and $R_{F2}$ are connected in parallel between a contact point between the first fuse F1 and the second fuse F2 and the control terminal of the fuse element 240. The heating resistors $R_{F1}$ and $R_{F2}$ emit heat depending on a voltage applied to the control terminal of the fuse element 240. The fuses F1 and F2 are fused by the heat from the heating resistors $R_{F1}$ and $R_{F2}$, thereby blocking the charging path of the battery cell 100.

For example, when the control terminal of the fuse element 240 is connected with the negative electrode of the battery cell 100 or the ground, current flowing through the large current path is introduced to the heating resistors $R_{F1}$ and $R_{F2}$ through the first fuse F1, thereby enabling the heating resistors $R_{F1}$ and $R_{F2}$ to emit heat. Accordingly, the fuses F1 and F2 are fused by the heat emitted by the heating resistor $R_{F1}$ and $R_{F2}$, to thereby block the charging path of the battery cell 100.

The fuse driving circuit 250 may monitor a voltage between ends of the first resistor R1 and apply a voltage for the fusing of the fuses F1 and F2 to the control terminal of the fuse element 240 depending on the voltage between both ends of the first resistor R1. When a voltage difference between the ends of the first resistor R1 is equal to or higher than a predetermined level, the fuse driving circuit 250 may fuse (or break) the fuses F1 and F2 by applying the voltage for the fusing of the fuses F1 and F2 to the control terminal of the fuse element 240.

In FIG. 2, the fuse driving circuit 250 may include first and second fuse driving switches T4 and T5 and resistors R6 and R7. The fuse driving circuit 250 may further include a control diode ZD connected in parallel with the first resistor R1. The control diode ZD may maintain the voltage between ends of the first resistor R1 to prevent the first resistor R1 or the first fuse driving switch T4 from being damaged.

The first fuse driving switch T4 has a first terminal connected to the first end of the first resistor R1 and a control terminal connected to the second terminal of the first resistor R1. For example, the first terminal of the first fuse driving switch T4 is connected to a contact point between the first resistor R1 and the power supply circuit 210. The control terminal of the first fuse driving switch T4 is connected to a control terminal of the second fuse driving switch T5 via a sixth resistor R6.

First and second terminals of the second fuse driving switch T5 are respectively connected to the negative electrode of the battery cell 100 (or ground) and the control terminal of the fuse element 240. A control terminal of the second fuse driving switch T5 is connected to the second terminal of the first fuse driving switch T4 via the sixth resistor R6. A seventh resistor R7 is connected between the first terminal and the control terminal of the second fuse driving switch T5.

The first fuse driving switch T4 and the second fuse driving switch T5 may respectively be formed of a P-channel electric field effect transistor and an N-channel electric field effect transistor. In this case, the first terminal, the second terminal, and the control terminal of each of the first and second fuse driving switches T4 and T5 may respectively serve as a source terminal, a drain terminal, and a gate terminal.

The first fuse driving switch T4 monitors the voltage between ends of the first resistor R1 and is turned on when the voltage between ends of the first resistor R1 is equal to or higher than a predetermined level.

When the first fuse driving switch T4 is turned on, the power supply circuit 210 is connected to the control terminal of the second fuse driving switch T5. Accordingly, the second fuse driving switch T5 is turned on, and the negative electrode of the battery cell 100 (or ground) is connected with the control terminal of the fuse element 240 by the second fuse driving switch T5, thereby fusing fuses F1 and F2 of fuse element 240.

In contrast, when the first fuse driving switch T4 is turned off, the connection between the power supply circuit 210 and the second fuse driving switch T5 is blocked. Thus, the control terminal of the second fuse driving switch T5 is connected with the negative electrode of the battery cell 100 (or ground). Accordingly, the second fuse driving switch T5 is turned off, and the connection between the negative electrode of the battery cell 100 and the fuse element 240 is blocked.

An example of the operation of the battery protection circuit in FIG. 2 will now be described. When the charging device 20 is connected to the battery pack 10, in a state in which the charging voltage of the battery cell 100 is lower than an overcharge voltage level, the charging controller 220 outputs the charging control current $I_{control}$ having an on level. When the charging control current $I_{control}$ having an on level is output from the charging controller 220, the switching circuit 230 electrically connects the first resistor R1 with the control terminal of the charging switch T1. Thus, a voltage from the positive electrode of the battery cell 100 is applied to the control terminal of the charging switch T1 via the first resistor R1. When the voltage from the positive electrode of the battery cell 100 is applied to the control terminal of the charging switch T1 via the first resistor R1, the charging switch T1 is turned on and connected to the charging path of the battery cell 100, thereby allowing the battery cell 100 to be charged.

The charging controller 220 outputs the charging control current $I_{control}$ having an off level when the charging voltage of the battery cell 100 is equal to or higher than the overcharge voltage level or the charging device 20 is separated from the battery pack 10. When the charging control current $I_{control}$ having an off level is output from the charging controller 220, the switching circuit 230 blocks the connection between the first resistor R1 and the control terminal of the charging switch T1. Accordingly, the charging switch T1 is turned off, and the charging path of the battery cell 100 is blocked, which blocks charging of the battery cell 100.

Referring to FIG. 3, when the charging switch T1 fails as a result of a short-circuit X between the first terminal and the control terminal of the charging switch T1, the charging switch T1 operates as a diode connected to the negative terminal of the battery cell 100. When the first resistor R1 is connected with the control terminal of the charging switch T1 by the switching circuit 230, the first end of the first resistor R1 is connected to the positive electrode of the battery cell 100 through the power supply circuit 210. The second end of the first resistor R1 is connected to the negative electrode of the battery cell 100 by the charging switch T1. Accordingly, the voltage difference between the ends of the first resistor R1 increases to turn on the first and second fuse driving switches T4 and T5. When the first and second fuse driving switches T4 and T5 are turned on, the control terminal of the fuse element 240 is connected to the negative electrode of the battery cell 100 (or ground) to fuse (or break) the fuses F1 and F2, thereby blocking the charging path of the battery cell 100.

The controllers and other processing features of the embodiments described herein may be implemented in logic which, for example, may include hardware, software, or both. When implemented at least partially in hardware, the controllers and processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers and processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, a battery protection circuit may prevent a battery cell of a battery pack from overcharging by establishing a connection with the charging path or blocking the connection depending on a charging state of the battery cell. Further, the battery protection circuit may monitor a failure state of the charging switch and may prevent the battery cell from overcharging by operating fuses to block the charging path when the charging switch fails. In addition, the battery protection circuit may actively operate a fuse by monitoring a failure state of the charging switch without using a, MCU or an additional protective IC, thereby reducing costs.

In an additional embodiment, the battery protection circuit may include an additional circuit for performing another protecting function. For example, the battery protection circuit may include a discharging switch for performing a protecting function related to the discharge. In addition, the fuse driving circuit may monitor the failure state of the discharging switch using a similar method in order to block the charging path.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments set forth in the claims.

What is claimed is:

1. A battery protection circuit, comprising:
    a charging switch connected to a first electrode of a battery cell to connect or disconnect a charging path of the battery cell;
    a first resistor including a first end connected to a second electrode of the battery cell;
    a charging controller to supply a charging control current;
    a switching circuit connected between a second end of the first resistor and a control terminal of the charging switch to connect the second end of the first resistor with the control terminal of the charging switch or to block a connection between the second end of the first resistor and the control terminal of the charging switch depending on the charging control current applied to a control terminal of the switching circuit;
    a fuse circuit connected in series to the charging path of the battery cell, the fuse circuit to block the charging path depending on a voltage applied to a control terminal of the fuse circuit; and
    a fuse driving circuit connected to the control terminal of the fuse circuit to switch the voltage applied to the control terminal of the fuse circuit depending on a voltage between the first and second ends of the first resistor.

2. The battery protection circuit as claimed in claim 1, wherein the fuse circuit is a self-control protection circuit.

3. The battery protection circuit as claimed in claim 2, wherein the fuse circuit includes:
    a fuse connected in series to a second electrode of the battery cell, and
    one or more heating resistors connected in parallel between the fuse and the control terminal of the fuse circuit, the one or more heating resistors to emit heat depending on the voltage applied to the control terminal of the fuse circuit.

4. The battery protection circuit as claimed in claim 2, wherein the fuse driving circuit includes:
    an N-channel transistor connected between the first electrode of the battery cell and the control terminal of the fuse circuit; and
    a P-channel transistor including a first terminal and a control terminal respectively connected to the first and second ends of the first resistor and a second terminal connected to a control terminal of the N-channel transistor.

5. The battery protection circuit as claimed in claim 4, wherein:
    when the voltage between the first and second ends of the first resistor exceeds a threshold level, the P-channel transistor is turned on to transfer a voltage applied to the first end of the first resistor to the control terminal of the N-channel transistor.

6. The battery protection circuit as claimed in claim 5, wherein:
    the N-channel transistor is turned on, depending on a voltage that is applied to the control terminal thereof through the P-channel transistor, to connect the first electrode of the battery cell with to the control terminal of the fuse circuit.

7. The battery protection circuit as claimed in claim 1, wherein the switching circuit includes a transistor connected between the second end of the first resistor and the control terminal of the charging switch, the transistor to connect the second end of the first resistor with the control terminal of the charging switch depending on the charging control current.

8. The battery protection circuit as claimed in claim 1, wherein:
    when the second terminal of the first resistor and the control terminal of the charging switch are connected by the switching circuit in a state where the control terminal of the charging switch and a first terminal of the charging switch are short-circuited due to a failure of the charging switch, the fuse driving circuit controls a voltage applied to the control terminal of the fuse circuit so that the fuse circuit blocks the charging path.

9. A battery pack, comprising:
    a battery cell;
    a first pack terminal and a second pack terminal;
    a charging switch having a first terminal connected to the first pack terminal, a second terminal connected to a first electrode of the battery cell and a control terminal;
    a first resistor to include a first end connected to a second electrode of the battery cell;
    a charging controller to supply a charging control current;
    a switching circuit connected between a second end of the first resistor and the control terminal, the switching circuit to connect the second end of the first resistor with the control terminal of the charging switch, the switching circuit to connect or to block a connection between the second end of the first resistor and the control terminal of the charging switch depending on the charging control current applied to a control terminal of the switching circuit;

a fuse circuit, connected in series between the second electrode of the battery cell and the second pack terminal, to block a charging path depending on a voltage applied to a control terminal of the fuse circuit; and a fuse driving circuit connected to the control terminal of the fuse circuit to switch the voltage applied to the control terminal of the fuse circuit depending on a voltage between the first and second ends of the first resistor.

10. The battery pack as claimed in claim 9, wherein:
the fuse circuit is a self-control protection circuit, and
the fuse circuit includes a fuse connected in series between the second electrode of the battery cell and the second pack terminal and one or more heating resistors connected in parallel between the fuse and the control terminal of the fuse circuit, the heating resistors emit to heat depending on the voltage applied to the control terminal of the fuse circuit.

11. The battery pack as claimed in claim 9, wherein the fuse driving circuit includes:
an N-channel transistor connected between the first electrode of the battery cell and the control terminal of the fuse circuit; and
a P-channel transistor configured to include a first terminal and a control terminal that are respectively connected to the first and second ends of the first resistor and a second terminal connected to a control terminal of the N-channel transistor.

12. The battery pack as claimed in claim 11, wherein:
when the voltage between the first and second ends of the first resistor exceeds a threshold level, the P-channel transistor is turned on to transfer a voltage applied to the first end of the first resistor to the control terminal of the N-channel transistor.

13. The battery pack as claimed in claim 12, wherein the N-channel transistor is turned on, depending on a voltage applied to the control terminal thereof through the P-channel transistor, to connect the first electrode of the battery cell with to the control terminal of the fuse circuit.

14. The battery pack as claimed in claim 9, wherein the switching circuit includes a transistor, connected between the second end of the first resistor and the control terminal of the charging switch, to connect the second end of the first resistor with the control terminal of the charging switch depending on the charging control current.

15. The battery pack as claimed in claim 9, wherein:
when the second terminal of the first resistor and the control terminal of the charging switch are connected by the switching circuit in a state where the control terminal of the charging switch and one of first and second terminals of the charging switch are short-circuited due to a failure of the charging switch, the fuse driving circuit controls a voltage applied to the control terminal of the fuse circuit so that the fuse circuit blocks the charging path.

* * * * *